United States Patent [19]

Groher et al.

[11] Patent Number: 4,857,359
[45] Date of Patent: Aug. 15, 1989

[54] PROCESS FOR OVERCOATING GRANULAR MATERIALS

[75] Inventors: Manfred Groher, Goldbach; Werner Heit, Linsengericht; Walter Schmittner, Waldaschaff; Wolfgang Warzawa, Hanau, all of Fed. Rep. of Germany

[73] Assignee: Hobeg mbH, Hanau, Fed. Rep. of Germany

[21] Appl. No.: 154,554

[22] Filed: Feb. 10, 1988

[30] Foreign Application Priority Data

Feb. 11, 1987 [DE] Fed. Rep. of Germany ....... 3704167

[51] Int. Cl.$^4$ ........................... B05D 1/28; B05D 1/40
[52] U.S. Cl. .......................................... 427/6; 427/11; 427/212; 427/242; 118/303; 118/242
[58] Field of Search ................... 427/6, 11, 212, 242; 118/418, 303, 304, 19, 244

[56] References Cited

U.S. PATENT DOCUMENTS

| | | | |
|---|---|---|---|
| 2,840,842 | 7/1958 | Kaheny | 427/242 X |
| 3,442,691 | 5/1969 | Pearson | 427/242 X |
| 3,719,516 | 3/1973 | Sturge et al. | 427/242 X |
| 3,974,307 | 8/1976 | Bower | 427/242 X |
| 4,014,432 | 3/1977 | Clothier et al. | 427/242 X |
| 4,311,111 | 1/1982 | Inaba | 427/242 X |

Primary Examiner—Shrive Beck
Attorney, Agent, or Firm—Beveridge, DeGrandi & Weilacher

[57] ABSTRACT

A process for overcoating granules with overcoating material in a granulator by providing the inside surface of the granulator, before introduction of the granules, with a layer of the overcoating material in a thickness of 0.1 to 1 mm, maintaining a preset entrainment height of the granules during the granulation process, and adding the overcoating material in the flowing particle bed. The deposited layers are very uniform.

3 Claims, 4 Drawing Sheets

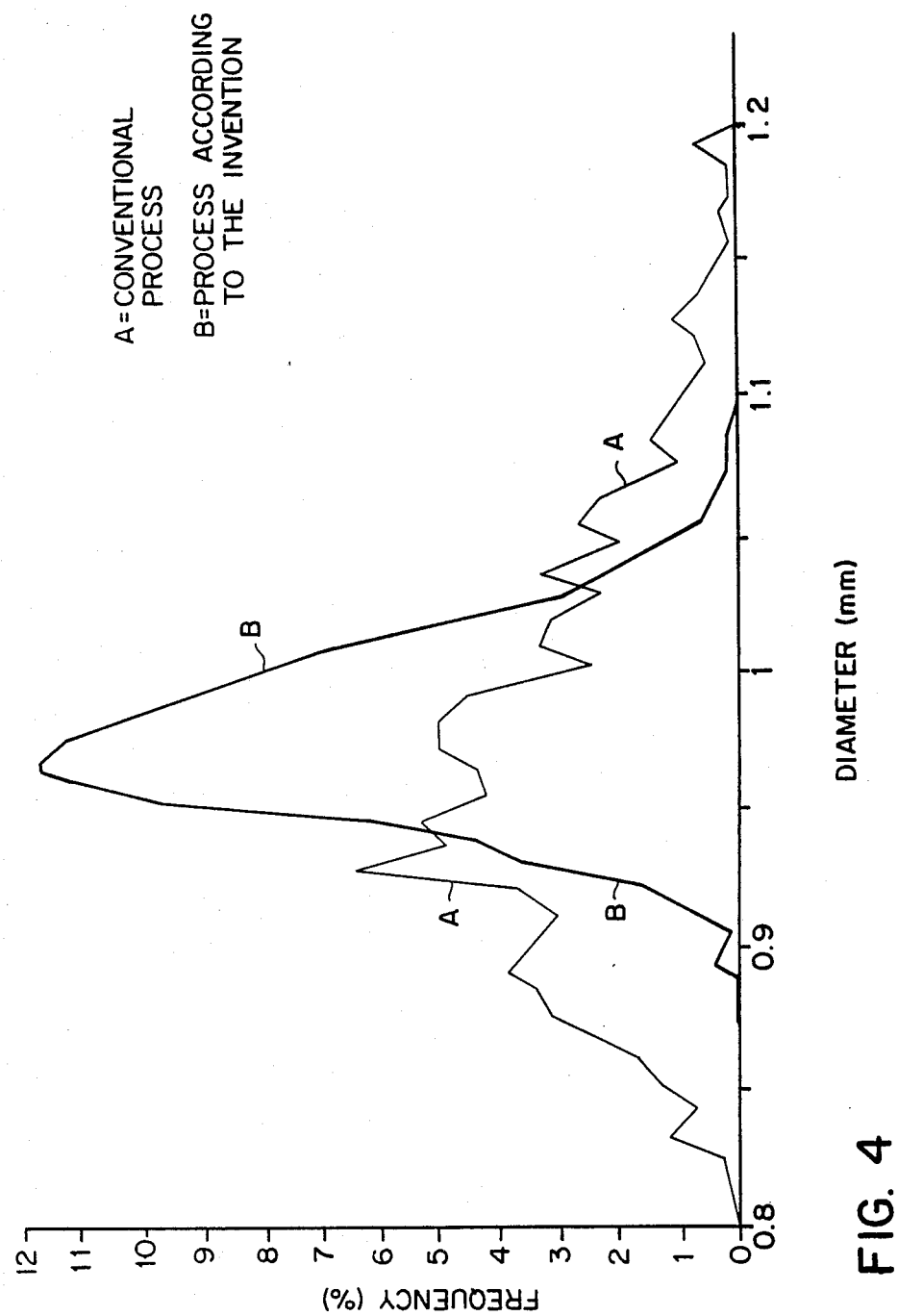

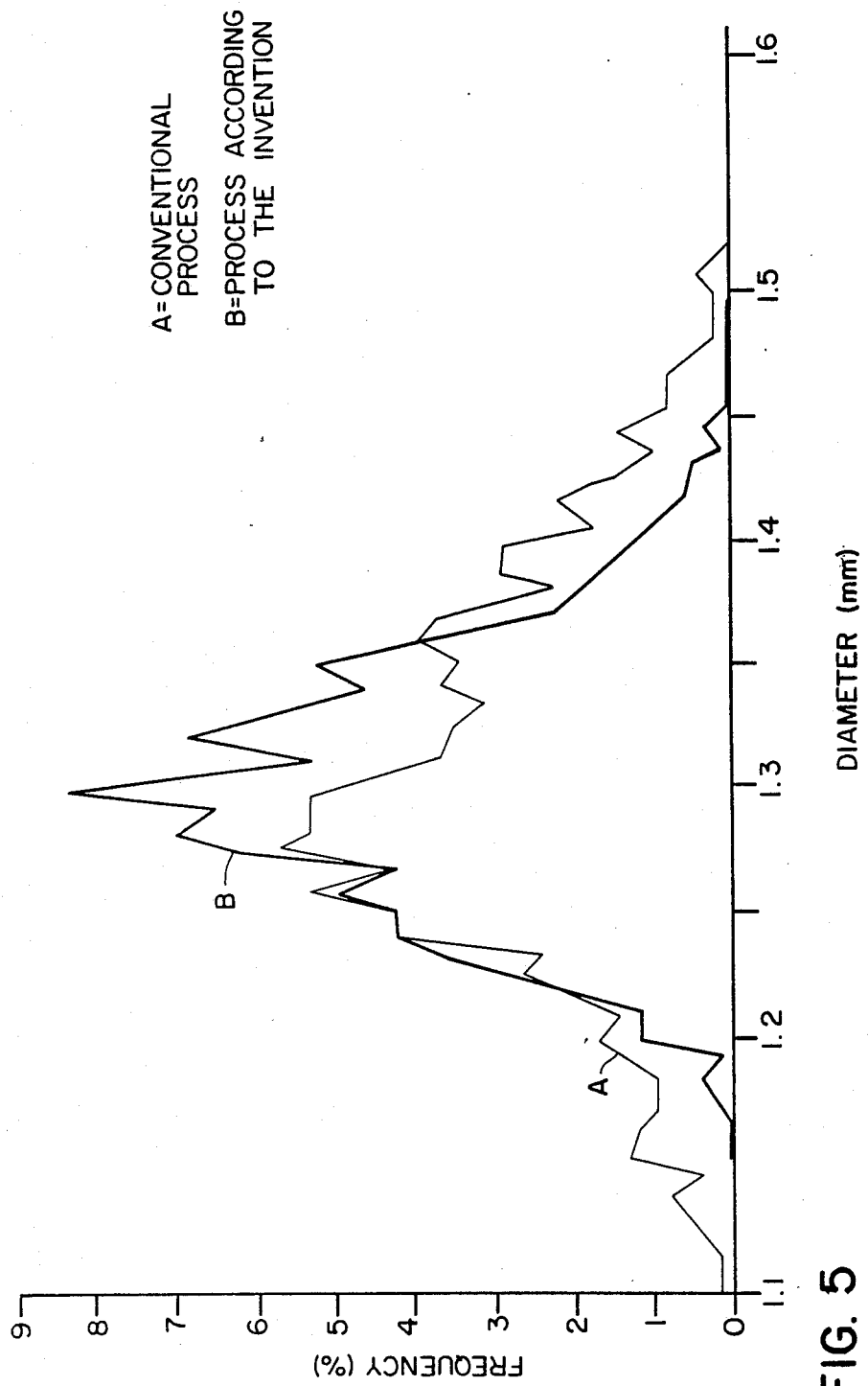

PROCESS FOR OVERCOATING GRANULAR MATERIALS

INTRODUCTION AND BACKGROUND

The present invention relates to a process for overcoating granules with overcoating material, especially for covering coated fuel particles with binder-containing graphite powder for high-temperature reactors. In carrying out the process, there is employed an apparatus comprising a granulator and pipes for adding overcoating material and liquid in measured portions.

Granulation as a process has been introduced in many areas of industry. Processes and apparatus therefor are known in numerous versions. The production of granules that do not turn into dust and are readily free-flowing is an important field of application. Another field is the overcoating of granular materials with specified layers. Thus, in the pharmaceutical industry, layers containing active ingredient are applied on granular backing materials. Also, when making nuclear fuel elements for high-temperature reactors, overcoating layers are applied on particles by granulation. In this case, the nuclear fuel particles coated with pyrocarbon and, if necessary, also with silicon carbide are provided before further processing with an additional overcoating layer of binder-containing graphite powder. These thusly overcoated fuel particles are then pressed under high pressure to form a graphitic matrix of the same material as the overcoating layer. The object of the pyrocarbon layers and, in some cases, of the silicon carbide layer is to retain in the fuel element the solid and gaseous fission products forming during reactor operation.

Therefore, these layers must not be damaged during the fabrication of the fuel elements, especially during the forming step by pressing. Even very high isostatic compressive loads must not lead to damage to the layers. Nevertheless, rupture of the layers occurs if coated particles come into contact with each other while being pressed into the matrix and local pressure peaks develop due to these point contacts.

The overcoating of the coated fuel particles with binder-containing graphite powder is for the purpose of preventing such point contacts by means of a spacing or blocking function. For this reason, the requirements for the quality of the overcoating layer, especially with respect to uniformity, is very high.

A disadvantage, especially with respect to quality assurance, is that the granulation process is generally very dependent on the skill of the operating personnel. The starting phase of the process in particular requires sure considerable skill and experience on the part of the operator. He proportions the powder and adds the liquid according to the flow behaviour of the granules and must correct the flow behavior, often even manually.

It has also proved very disadvantageous when applying granulation to the field of fuel element fabrication for high-temperature reactors, in that layer thicknesses of 200 micron and higher, as are necessary for particles with an additional silicon carbide layer, can be applied with the necessary uniformity only if the overcoating process is interrupted several times and the particles are separated with the desired layer thickness. If this separation does not occur, a very wide range layer-thickness distribution is achieved which is not acceptable for the purpose at hand.

SUMMARY OF THE INVENTION

One object of the present invention is therefore to provide a process for overcoating granules with overcoating material in such a way that the narrowest possible layer-thickness distribution of the overcoating material can be achieved even in the case of relatively great layer thicknesses and the process can be carried but as independently of the experience level personnel as possible.

In accordance with the above and other objects, one feature of the invention resides in a process for overcoating granules with overcoating material, more particularly for overcoating coated fuel particles with binder-containing graphite powder for high-temperature reactors by means of an apparatus comprising a granulator and pipe or conduit means for adding overcoating material and liquid in measured portions. The term "granulator" as herein should be considered as essentially synonymous with "coating drum". The inside surface of the granulator, before introduction of the granules, is provided with a layer of the overcoating material in a thickness of 0.1 to 1 mm. In addition, a preset entrainment height of the granule is maintained during the subsequent granulation process by varying the inclination and/or speed of the granulator. The addition of the overcoating material is carried out by introducing it in the midst of the granules in the flowing particle bed. For this purpose, the granulator is provided before introduction of the granules with a layer of the overcoating material in a thickness of 100 to 1000 micron. In the subsequent granulation process, the inclination and/or the rotational speed of the granulator is controlled by means of the continuously measured entrainment height of the granules in such way that a preset entrainment height of the granules is maintained. Moreover, the pipe or conduit for adding the covering material is immersed into the granules, so that the addition of the covering material occurs in the midst of the granules.

In a preferred embodiment of the process according to the invention, the overcoating material is always added in a region of the flowing particle bed which, from the top, is located a height of 0.2 to 0.5 of the total height of the flowing particle bed. Still further, the covering material is preferably added with a delivery pipe which, viewed in front elevation, forms an angle alpha of 10 to 30°, most preferably 20°; with the vertical and facing against the direction of rotation of the granulator.

Entrainment height of the granules is the height difference between the lowest and highest points through which the particles of the granules pass during the covering process, the plane of the granulator bottom being chosen as the spatial reference system.

Through the means of the coating, the surface of the granulator has, right from the beginning of the granulation process, the lining which otherwise would only build up in the course of the process.

Thus, as early as the difficult initial phase of the granulation process an optimum surface structure of the particles can be achieved as the prerequisite for good flow behavior of the granules.

As will be apparent to those skilled in the art, any suitable granules can be treated in accordance with the present invention with any suitable overcoating material and appropriate solvent.

The good flow behaviour of the granules during the entire granulation process is of decisive influence on the trouble-free progress of the process and on the quality of the overcoating obtained thereby. A surprising finding in accordance with the present invention was that the entrainment height is suitable as a measurable variable for the quantitative evaluation of the quality of the flow behavior. Thus, both a lower and an upper limiting value can be given, compliance with which ensures optimum flow behavior. These limiting values are empirically determined. They depend on the geometry of the granulator and on the properties of the granules. The entrainment height can be determined, for example, by two detectors as limiting sensors. Depending on the granules, the detection can be determined, for example, on the basis of optics, electrical conductivity, or even radioactive emission. In these cases, the detectors control in a conventional manner the inclination and/or speed of the granulator by means of a control unit.

An important improvement of the granulation process of this invention is also the fact that the outlet opening of the delivery pipe for the overcoating powder is not, as is customary in the art, located above the flowing granules, but instead dips into the granules and is immersed in the body of granules. Viewed in front elevation, the delivery pipe preferably forms an angle, alpha, of 10 to 30° with the vertical, the outlet opening facing against the direction of rotation of the granulator.

It has been found that the optimum immersion depth of the delivery pipe varies from 20 to 50% of the height of the following particle bed, measured from the top. If the volume increases so much that this range cannot be kept with a fixed delivery pipe, the latter is moved appropriately upwards under computer program control, as a function of time, for example.

By this technique the bandwidth of overcoating-layer thicknesses within a fabrication batch is significantly improved. The use of this technique means, for example when applying 200-micron thick graphite overcoating layers on fuel particles provided with a silicon carbide layer, that the otherwise necessary intermediate screening can be dispensed with. This is one prerequisite for automation of this process.

BRIEF DESCRIPTION OF THE DRAWINGS

The process according to the invention will be discussed in greater detail by reference to FIGS. 1 to 5, wherein FIG. 1 schematically shows the overall granulator of the present invention;

FIGS. 4 and 5 show diameter distributions of the granules obtained in accordance with the present invention.

DETAILED DESCRIPTION OF THE INVENTION

Figure 1:
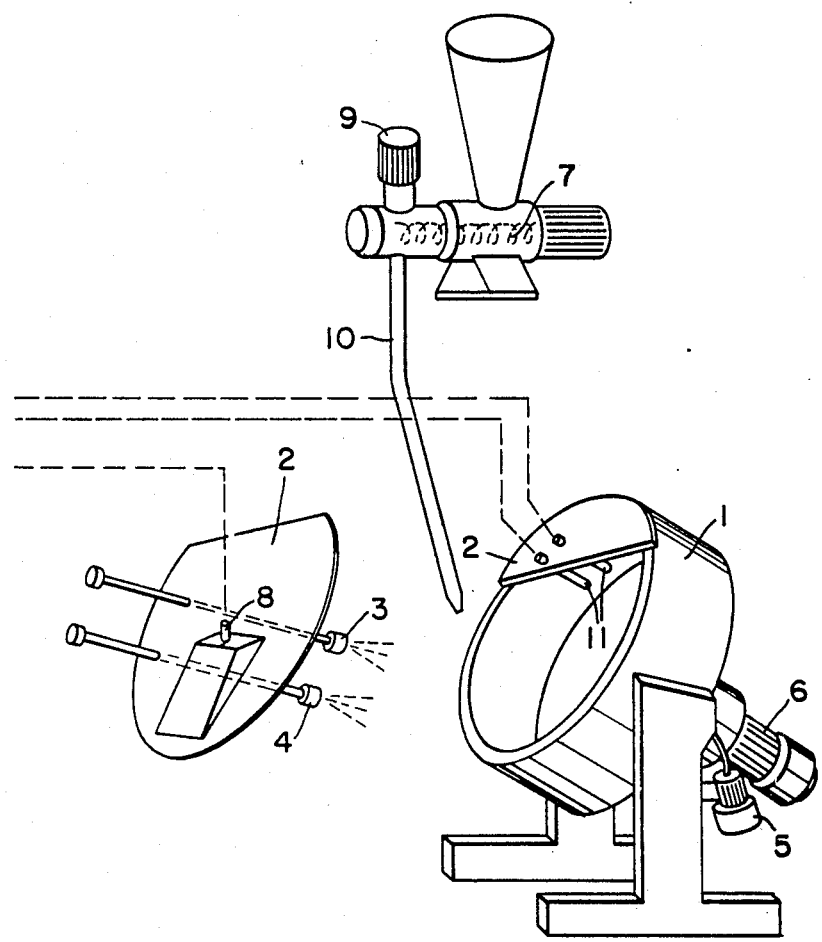

As shown in FIG. 1, the granulator (1) is a generally cylindrical, rotatable vessel having a larger diameter than length, for example, a diameter of 1000 nm and a depth of 280 mm. It is driven by a continuously adjustable motor (6) of conventional type. The inclination of the granulator (1) during the granulation process can be varied by another motor (5). The structure of the granulator can vary as will be understood in the art.

Proportioning with the overcoating material feed material is effected by means of a screw feeder (7) of conventional type.

A helical filament with motor (9) provides for a continuously free outflow from the delivery pipe (10) of screw feeder (7) for the overcoating material.

On the front cover (2) of the granulator (1) are mounted spray nozzles (3, 4) for adding the liquid, a nozzle (8) for coating the granulator, and the two detectors or sensors (11) for ensuring the entrainment height of the granules.

The following examples are illustrative of the present invention.

EXAMPLE 1

For the fabrication of fuel elements for hightemperature reactors, coating of the granulator (1) is carried out as the first step in the process sequence. For this purpose, a suspension of binder-containing graphite powder and solvent (methanol/acetone) is sprayed fully automatically with a two-phase nozzle (8) onto the sliding surface in the granulating drum (1). After drying, the layer thickness is approximately 300 micron.

Figure 2:
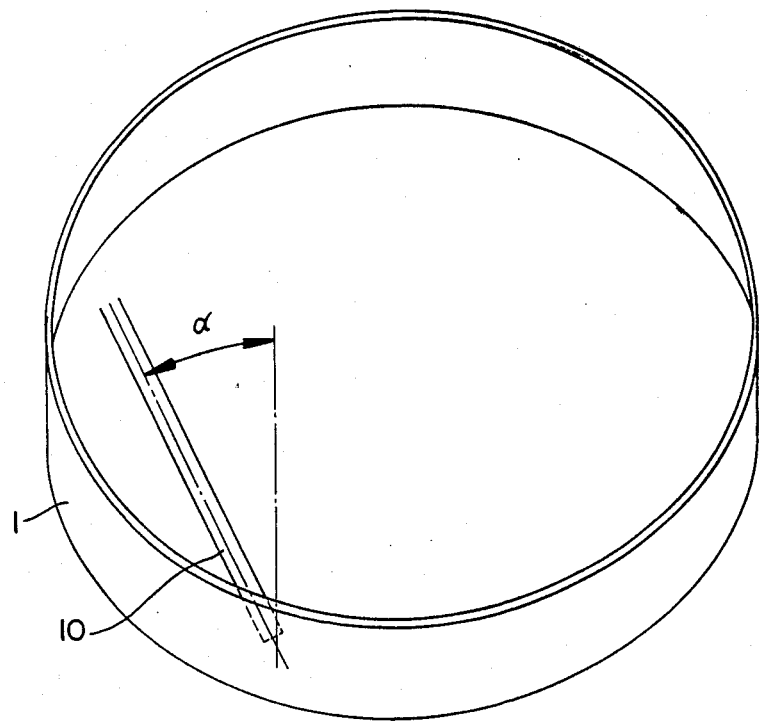
FIG. 2 is a schematic representation of the granulator of the present invention.

To apply a 100-micron thick overcoated layer, as is usual for coated fuel particles without a silicon carbide intermediate layer, 5 kg of these fuel particles (average diameter 770 micron, average density 2.7 g/cm$^3$) is introduced into the granulator (1). The delivery pipe (10) is adjusted such that it dips approximately 1 cm into the flowing particle bed and, viewed in front elevation, it forms an angle of 10 to 30°, preferably 20° with the vertical, as shown in FIG. 2.

According to a preset program, in a manner known from the prior art and as a function of time, the particles are now wetted by spraying in the solvent and adding the overcoating material.

Figure 3:
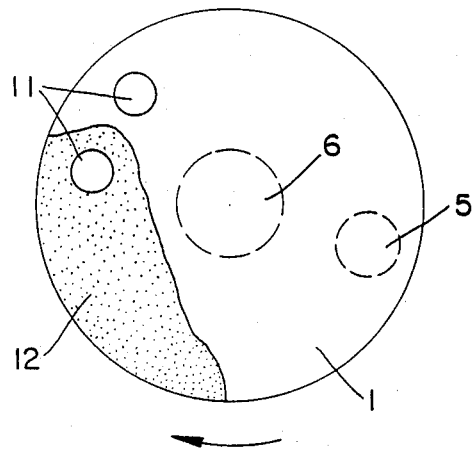
FIG. 3 schematically represents the entrainment height.

The speed and the inclination of the granulator (1) are adjusted at all times by means of two measuring probes (11) so that the entrainment height of the granules (12) is always kept between the two probes (11) as shown in FIG. 3. In this case, measuring probes are used which respond to the beta and gamma emission of the fuel particles.

The two measuring probes (11) with signal analyzer form, for example, a two-level control. If neither of the two measuring probes (11) responds, the entrainment height is too low, the speed is increased or the angle of the granulator (1) relative to the vertical is increased. If only the low measuring probe responds, the entrainment height is located between the two probes, corresponding to the desired value: the speed and inclination of the granulator (1) remain unchanged. If both probes (11) respond, the entrainment height is too high: the speed is reduced or the angle of the granulator (1) relative to the vertical is decreased until the high probe no longer responds. Optimum flow of the granules and thereby a uniform density and thickness of the overcoating layer is ensured by this control system.

Under these preset conditions, the average overcoating thickness is an clear function of the overcoating time; for evrey 100 micron, 35 minutes are needed. At the end of the overcoating process, the particles are removed and dried.

A measure for the overcoating quality is the distribution of the thickness of the overcoating layers. This in turn is reflected in the distribution of the diameters of the overcoated particles.

FIG. 4 shows the distributions of diameters according to the process of the invention and according to a prior art process. In the prior art process, the bottom of the granulator is not precoated and the powder delivery pipe does not dip into the flowing particle bed. The addition of solvent and overcoating powder is effected on the basis of visual evaluation of the flow behavior of the granules. The overcoating is also carried out without interruption of the process.

FIG. 4 shows that the process according to the invention provides a clearly narrower diameter distribution and thus a better quality of overcoating.

EXAMPLE 2

As described in Example 1, coating of the granulator bottom is carried out first. Thereafter, 9 kg of fuel particles with an SiC intermediate layer (average diameter: 900 micron, average density: 3.2 g/cm$^3$) is introduced into the granulator (1) and the delivery pipe (10) for the covering material is adjusted as in Example 1. According to a preset program, a covering layer of 200 micron thickness is applied without interruption in a continuous operating step.

FIG. 5 shows the distribution of diameters of thusly covered particles. For comparison, the corresponding distribution obtained according to the prior art process is also plotted. The prior art process in this case was carried out as described in Example 1, but with the difference that two intermediate screening steps had to be carried out because of the covering thickness of 200 micron.

The process according to the invention provides just as narrow a size distribution as the much more expensive and highly personnel-dependent prior art process.

Further variations and modifications of the present invention will be apparent from the foregoing and are intended to be encompassed by the claims appended hereto.

We claim:

1. A process for overcoating coated fuel particles with binder-containing graphite powder for high-temperature reactors comprising adding to the inside surface of a rotatable granulator adapted to provide a flowing particle bed, before introduction of the granules, a layer of overcoating material, intended to overcoat said granules, in a thickness of 0.1 to 1 mm, maintaining a preset entrainment height of the granules during subsequent granulation by varying the inclination and/or rotational speed of the granulator, and adding the covering material by pipe means immersed in the midst of the granules in a flowing particle bed.

2. The process according to claim 1, wherein the overcoating material is always added in a region of the flowing particle bed which, from the top, is located at a height of 0.2 to 0.5 of the total height of the flowing particle bed.

3. The process according to claim 1, wherein the covering material is added with a delivery pipe means which, viewed in front elevation, forms an angle alpha of 10° to 30° with the vertical and facing against the direction of rotation of the granulator.

* * * * *